(12) United States Patent
Doron et al.

(10) Patent No.: US 10,742,679 B2
(45) Date of Patent: *Aug. 11, 2020

(54) MULTI-TIERED NETWORK ARCHITECTURE FOR MITIGATION OF CYBER-ATTACKS

(71) Applicant: RADWARE, LTD., Tel Aviv (IL)

(72) Inventors: Ehud Doron, Moddi'in (IL); David Aviv, Tel Aviv (IL); Yotam Ben Ezra, Ra'anana (IL); Lev Medvedovsky, Netanya (IL)

(73) Assignee: Radware, Ltd., Tel Aviv (IL)

(*) Notice: Subject to any disclaimer, the term of this patent is extended or adjusted under 35 U.S.C. 154(b) by 6 days.

This patent is subject to a terminal disclaimer.

(21) Appl. No.: 16/164,260

(22) Filed: Oct. 18, 2018

(65) Prior Publication Data
US 2019/0052671 A1  Feb. 14, 2019

Related U.S. Application Data

(63) Continuation of application No. 15/707,292, filed on Sep. 18, 2017, now Pat. No. 10,129,297, which is a continuation of application No. 14/640,814, filed on Mar. 6, 2015, now Pat. No. 9,769,201.

(51) Int. Cl.
*H04L 29/06* (2006.01)
*H04L 12/911* (2013.01)

(52) U.S. Cl.
CPC .......... *H04L 63/1458* (2013.01); *H04L 63/14* (2013.01); *H04L 63/1416* (2013.01); *H04L 47/726* (2013.01)

(58) Field of Classification Search
CPC . H04L 63/1458; H04L 63/1416; H04L 63/14; H04L 47/726
See application file for complete search history.

(56) References Cited

U.S. PATENT DOCUMENTS

2005/0131993 A1  6/2005  Fatula
2005/0235352 A1* 10/2005  Staats ............... H04L 41/082
                                                    726/14
2006/0277409 A1  12/2006  Galwas
(Continued)

*Primary Examiner* — Meng Li
(74) *Attorney, Agent, or Firm* — M&B IP Analysts, LLC

(57) ABSTRACT

A method and system for controlling multi-tiered mitigation of cyber-attacks. The method comprises monitoring at least availability and load of each protection resource in a multi-tiered communication network, wherein each tier in the multi-tiered communication network includes a plurality of protection resources having capacity and security capabilities set according to the respective tier; for each protection resource, computing a current aggregated load metric (ALM); determining based on at least one of the computed ALM and security capabilities of a respective protection resource, if the respective protection resource assigned to a protected entity can efficiently handle a detected cyber-attack against the protected entity; and selecting at least one new protection resource to secure the protected entity, upon determining the protection resource cannot efficiently handle the detected cyber-attack, wherein the selection is based on at least one of the computed ALM and a security capabilities of the at least one protection resource.

20 Claims, 5 Drawing Sheets

(56) References Cited

U.S. PATENT DOCUMENTS

| | | |
|---|---|---|
| 2011/0131650 A1* | 6/2011 | de los Reyes ...... H04L 63/0209 726/22 |
| 2011/0196961 A1 | 8/2011 | Wang et al. |
| 2012/0059934 A1* | 3/2012 | Rafiq ................. H04L 67/1008 709/225 |
| 2013/0219037 A1 | 8/2013 | Thakkar et al. |
| 2013/0254879 A1* | 9/2013 | Chesla ............... H04L 63/1458 726/22 |
| 2014/0003233 A1* | 1/2014 | Rune ................... H04L 47/125 370/230 |
| 2014/0282505 A1* | 9/2014 | Tsadok ............... G06F 9/45558 718/1 |
| 2014/0325038 A1 | 10/2014 | Kis |
| 2015/0260787 A1 | 9/2015 | Chang |
| 2016/0219516 A1* | 7/2016 | Subramanian .... H04W 52/0219 |

\* cited by examiner

MULTI-TIERED NETWORK ARCHITECTURE FOR MITIGATION OF CYBER-ATTACKS

CROSS-REFERENCE TO RELATED APPLICATIONS

This application is a continuation of U.S. patent application Ser. No. 15/707,292 filed Sep. 18, 2017, which is a continuation of U.S. patent application Ser. No. 14/640,814 filed on Mar. 6, 2015, now U.S. Pat. No. 9,769,201 the contents of which are hereby incorporated by reference.

TECHNICAL FIELD

This disclosure generally relates to multi-tiered networks, and particularly to techniques for mitigating denial of service attacks in such networks.

BACKGROUND

Large scale networks are typically composed of two types of networks, an edge (or access) network and a backbone network. An edge network provides network connectivity to user devices or hosts while the backbone network connects two or more edge networks together. Examples for large scale networks are cloud computing platforms, data centers, service provider networks, and the like. The architecture of a large scale network is constructed as a multi-tiered network including a backbone network as a main (root) tier and a plurality of the edge networks which are child tier connected to a main tier. Typically, there is one backbone network and many edge networks that are connected thereto. The edge networks may be connected in a tiered architecture as well.

There are some unique properties for large-scale networks. One such property is that the network resources can reside in many different places. As an example, for server cloud computing applications, a large number of data centers or servers collaborate to provide services to clients. Furthermore, in such type of networks the resource availability is dynamic due to the changing network condition, network activities, and applications. In addition, services provided by servers and/or data centers are not homogeneous, but rather such services are rich and diverse.

The properties and architecture of large-scale networks pose certain challenges in protecting the network's resources against cyber threats, in particular denial of service (DoS) and distributed DoS (DDoS) attacks. The challenges result from the many resources and services included in such a network, collaboration between resources, and the dynamic services provided by such networks. The complexity of cyber-attacks plays a major role here as DoS/DDoS attack campaigns are more sophisticated and aggressive.

A straightforward solution is to deploy detection/mitigation systems in the edge and backbone networks. The systems are typically deployed in a peer of each edge network and in various peers of the backbone networks or at pre-defined scrubbing centers. The types and security capabilities of the detection/mitigation systems to be deployed and their locations are predetermined and static. In order to ensure mitigation and/or detection, high capacity and capabilities systems typically deployed in the backbone network are deployed in the edge networks. This causes underutilization of valuable and expensive mitigation resources. Further, high capacity mitigation systems are typically expensive. This effects the return on investment (ROI) of the service providers as customers cannot recap the costs of such high capacity mitigation/detection systems.

Furthermore, due to the static nature of the current solutions to detect and mitigate cyber-attacks in large scale networks, such solutions are not scalable and cannot be adapted to changes in the architecture and/or resources' allocations in the networks in an efficient way. Furthermore, such solutions are not dynamic and cannot be adapted to dynamically changed cyber-attacks patterns and the dynamics of modern networks and applications. As an example, in a client cloud computing infrastructure, resources (e.g., virtual machines) can be turned on and off in an unpredictable fashion and position in the cloud network.

Thus, in order to allow efficient and cost effective protection against cyber threats, it would be advantageous to provide a reliable, robust, and scalable solution that efficiently and dynamically detects and mitigates cyber threats. It would be further advantageous if the proposed solutions would efficiently manage mitigation and detection resources in a centralized network-wide manner.

SUMMARY

A summary of several exemplary embodiment of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for controlling multi-tiered mitigation of cyber-attacks. The method comprises monitoring at least availability and load of each protection resource in a multi-tiered communication network, wherein each tier in the multi-tiered communication network includes a plurality of protection resources having capacity and security capabilities set according to the respective tier; for each protection resource, computing a current aggregated load metric (ALM); determining based on at least one of the computed ALM and security capabilities of a respective protection resource, if the respective protection resource assigned to a protected entity can efficiently handle a detected cyber-attack against the protected entity; and selecting at least one new protection resource to secure the protected entity, upon determining the protection resource cannot efficiently handle the detected cyber-attack, wherein the selection is based on at least one of the computed ALM and a security capabilities of the at least one protection resource.

Certain embodiments disclosed herein also include a system for controlling multi-tiered mitigation of cyber-attacks. The system comprises at least one processing unit; and a memory, the memory containing instructions that, when executed by the at least one processing unit, configure the system to: monitor at least availability and load of each protection resource in a multi-tiered communication network, wherein each tier in the multi-tiered communication network includes a plurality of protection resources having capacity and security capabilities set according to the respective tier; for each protection resource, compute a current aggregated load metric (ALM); determine based on at least one of the computed ALM and security capabilities of a respective protection resource, if the respective protection resource assigned to a protected entity can efficiently handle a detected cyber-attack against the protected entity; and select at least one new protection resource to secure the protected entity, upon determining the protection resource cannot efficiently handle the detected cyber-attack, wherein the selection is based on at least one of the computed ALM and a security capabilities of the at least one protection resource.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
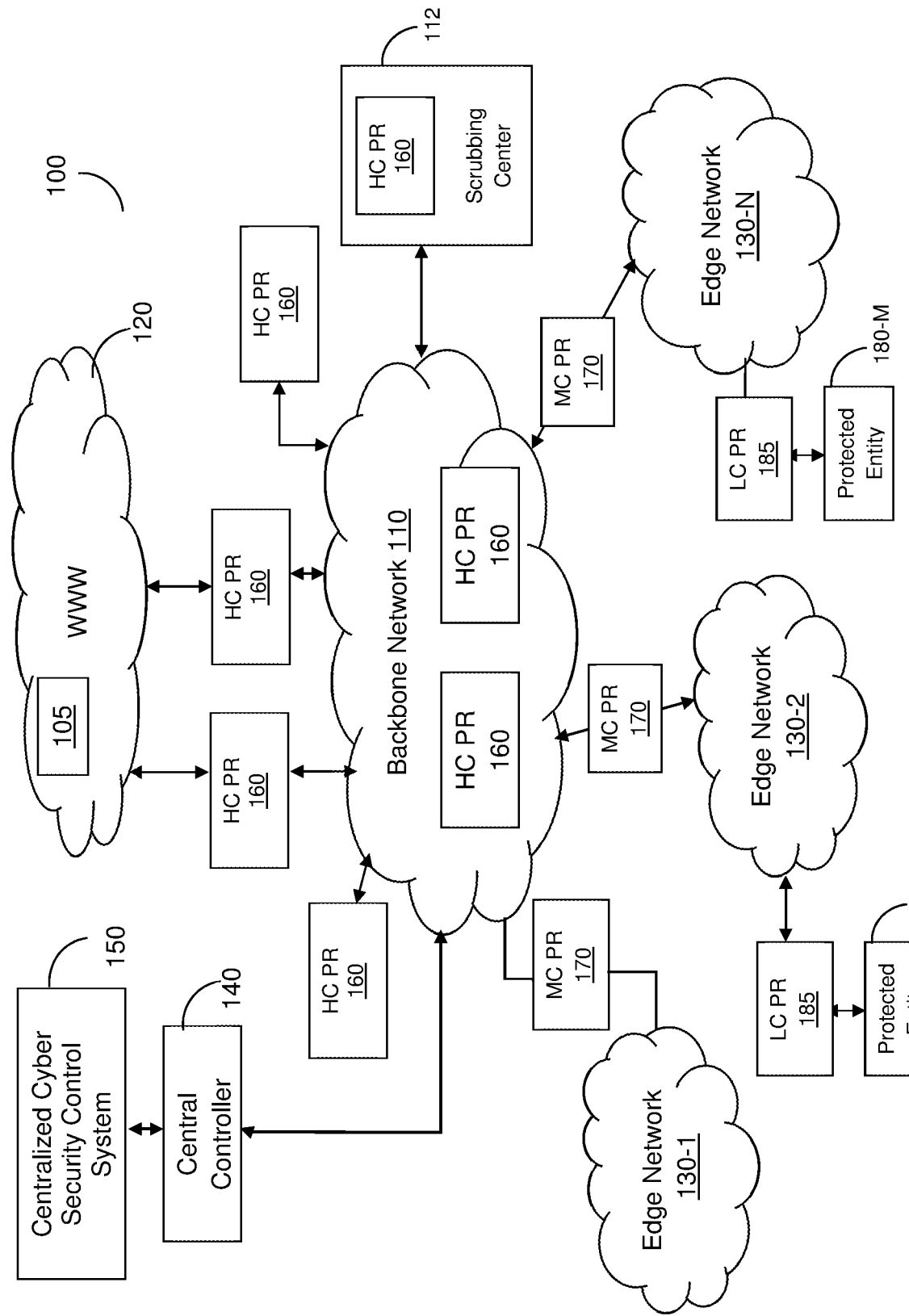
FIG. 1 illustrates a diagram of a network utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating a topology of a network 100 utilized to describe the various embodiments disclosed herein. The network 100 includes a backbone network 110 connected to the World Wide Web (WWW) 120 and to a plurality of edge networks 130-1 through 130-N (collectively referred to hereinafter as edge networks 130 or individually as an edge network 130). The backbone network 110 may be operated or maintained by an Internet service provider (ISP) or other service provider, a network carrier, a cloud provider, and the like. The edge network 130 may be a datacenter, an enterprise network, and the like. The edge network 130 allows access to a plurality of computing resources (not shown). In one exemplary embodiment, such computing resources are realized as virtual machines connected to a load balancer, an application delivery controller, and the like.

A virtual machine (VM) is a software implementation of a computer that executes programs in a way that is similar to a physical machine. The virtualization technology allows the sharing of the underlying physical hardware resources between different virtual machines in an isolated manner. The isolation and independence of VMs allow creating "tenants" and providing multi-tenancy support in an edge network 130. A "tenant" is a group of one more VMs hosted in a physical machine and provisioned to provide services to a particular customer, for example, based on a service-level agreement (SLA). Virtualization further provides a high level of dynamics for creating, deleting, and powering on/off, added or removed from their physical machines. The disclosed security solution accounts for such dynamic challenges.

In a certain configuration, the backbone network 110 and/or any of the edge networks 130 can be realized as a software defined network (SDN). The SDN allows for building a networking architecture that provides centralized management of network elements rather than a distributed architecture utilized by conventional networks. Typically, in an SDN, a network element follows networking operations, such as routing decisions received from a central controller 140. In one configuration of a SDN, the central controller 140 communicates with the network elements using an OpenFlow protocol which provides a network abstraction layer for such communication. The OpenFlow protocol, and its likes, allows for adding programmability to network elements for the purpose of packets-processing operations under the control of the central controller 140, thereby allowing the central controller 140 to define the traffic handling decisions in the network element. To this end, traffic received by a network element that supports the OpenFlow protocol is processed and routed according to a set of rules defined by the central controller 140. In another embodiment, the backbone network 110 and/or any of the edge networks 130 can be realized using other network control functionalities, such as the BGP and BGP FlowSpec.

According to one embodiment, a plurality of defense tiers are defined in the large scale network 100 and are controlled by a centralized cyber security control system 150 (hereinafter "security control system 150"). In an exemplary and non-limiting embodiment, the following defense tiers are defined; a cloud-tier (tier-0); a backbone-tier (tier-1), an edge-tier (tier-2), and an entity-tier (tier03). The cloud-tier (tier-0) includes a scrubbing center 105 operable or communicatively connected in the WWW 120. The cloud based scrubbing center 105 is configured to include clean high volumes of malicious traffic that typically cannot be efficiently handled by resources of the backbone network 110.

The backbone-tier (tier-1) includes high capacity protection resources (collectively refer to as high capacity protection resources 160) deployed in the backbone network 110. In an embodiment, the high capacity protection resources 160 of the tier-1 contain a high capacity of detection and mitigation resources. The high capacity protection resources 160 are mainly configured to handle network layer attacks required without limitation to protect network 110 (or refer to as infrastructure protection), for example detection and/or mitigation of DoS/DDoS at the network (layer-4) layer. Along with Layer-4 detection and mitigation, the high capacity protection resources 160 can also handle Layer-7 based attacks. It should be noted that the capacity of a protection resource does not relate only to the amount of traffic that a resource can process, but also to mitigation and detection capabilities (generally referred to as "security capabilities") that such a resource is configured with. For example, one protection resource can be configured with advance challenges to detect bots, while other resource cannot perform any challenges.

In some embodiments, the high capacity protection resources 160 can be deployed in different locations at the backbone network 110 including, but not limited to, peers of the backbone network 110 and/or scrubbing centers 112. A scrubbing center 112 may be a global or a regional scrubbing center. Typically, suspicious traffic is passed or diverted through a scrubbing center 112, which performs one or more mitigation actions on the incoming traffic and forwards legitimate clean traffic back to the backbone network 110.

The deployment mode of a high capacity and high security capabilities protection resource 160 may be, for example, inline, out of path (OOP), local out of path (LOOP), or in-device (e.g., mitigation device that is embedded in other networking element, such as a switch or router). In a non-limiting embodiment, any high capacity protection resource 160 can act as a security server that detects and/or mitigates large-scale DoS/DDoS attacks as detailed, for example, in U.S. patent application Ser. Nos. 13/425,978 and 13/306,360 to Chesla, et al., assigned to the common assignee and hereby incorporated by reference.

The edge-tier (tier-2) is designed to the various edge networks 130 through the medium capacity protection resources (collectively refer to as medium capacity protection resources 170) deployed inline or OOP between the backbone network 110 and the respective edge networks 130-N. The medium capacity protection resources 170 are configured to detect and/or mitigate DoS/DDoS attacks at the application layer (layer-7) and/or network layer (layer 4) per a customer network.

The entity-tier (tier-3) secures the protected entities 180-1 through 180-M (collectively referred to hereinafter as protected entities 180 or individually as a protected entity 180) connected to the edge networks 130. The protected entity 180 may be a tenant, a computing infrastructure, server or groups of server and/or a service. Typically, the protected entity 180 is associated with a customer paying for the security services. A protected entity 180 may be configured by an IP address for a dedicated server (for example, a single VM) protection, or by a variable size subnet for a network protection (a group of VMs). The protected entity 180, in one embodiment, can be a server, or a group of servers, deployed in any one of the backbone network 110 and/or the edge network 130.

This entity-tier (tier-3) typically contains low capacity protection resources (collectively refer to as low capacity protection resources 185). The low capacity protection resources 185 are configured to detect and/or mitigate DoS/DDoS attacks at the application layer (layer-7) and/or network layer (layer 4) per a protected entity: tenant or customer. This allows for implementing security mechanisms per a specific network location, tenant, and the like. The specific security mechanism to be utilized may be determined by a security policy. It should be noted that typically each of the tier-2 and tier-3 as whole include aggregation of resources that provide high capacity resources.

It should be noted that the low, medium, or high capacity protection resources are utilized only between the different resources and determine their capacity relative to each other. It should be further noted that a protection resource can be a virtual machine, a physical machine, or combination thereof. In an embodiment, when the protection resource is a virtual machine, the capacity of each protection resource can be increased.

In an embodiment, the low capacity protection resources 185 can be deployed as an application layer (virtual) in Inline, LOOP, in-device, or a virtual appliance (in-server). In certain implementations, a low capacity protection resource 185 can be provisioned with lower security capabilities and can even act as a probe device for attack detection purposes only. In such implementations, a low capacity protection resource 185 acting as a probe is directly connected to a protected tenant (e.g., a VM). When an attack is detected by the detection device probe, the low capacity protection resource 185 signals an attack indication along with attack details to the security control system 150. In response, the security control system 150, upon receiving such indication, selects one or more protection resources 160 and 170 to mitigate the attack. As will be discussed in more detail below, the protection resource or resources 160, 170, and 185 can be selected from any defense tier defined in the network 100.

Specifically, according to the disclosed embodiments, the security control system 150 is configured to dynamically control the protection resources 160, 185 and 170 to allow efficient detection and mitigation of attacks across tiers in the network 100. To this end, the security control system 150 ensures maximum utilization and best usage of each protection resources in the network 100 at any attack scale.

In another embodiment, the centralized security control system 150 is configured to control the network elements to divert traffic to one or more scrubbing centers 112 deployed in tier-1 or to a scrubbing center 105 deployed in tier-0. In an embodiment, the traffic diversion can be performed by means of the central controller 140 when the network 100 includes at least one SDN. The primary selection of the optimal tier or tiers to mitigate an on-going attack is based on a plurality of parameters related to the existing load of the protection resources 160, 185 and 170, security capabilities provisions of the protection resources, attack scale, load of network resources, SLA guaranteed to protected customers, tenants to be protected, and so on. It should be noted that in certain implementations, the functionality of the centralized security control system 150 can be integrated in the central controller 140.

In certain exemplary embodiments the centralized security control system 150 is set up with the topology of the large scale network 100. Specifically, the security control system 150 is configured with the properties of each resource 160, 185 or 170. Such attributes include, but are not limited to, an identifier, a network address (e.g., IP address), a location within the network (i.e. at network 110, edge network 130, at a protection entity 180, and so on), the security (mitigation/detection) capabilities, and so on. In an embodiment, the configuration data can be obtained from the central controller 140 and/or external management or orchestration systems.

The centralized security control system 150 actively monitors the state of each resource in the various defense tiers defined above. In an embodiment, for each protection resource (160, 170, 185), the availability and the load of the protection resource is checked. In an embodiment the load monitoring includes evaluating a plurality of load parameters, such as the CPU load conditions, the memory load conditions, the number of provisioned security services, a ratio between the current used security services and the total security service, and the protection resource links load condition. The value of each monitored load parameter may be an integer number, a fractional number between 0 to 1 (where higher number closes to 1 represents a higher load condition), or any other conventional normalized representation. The monitoring of the load and availability can be performed at a preconfigured time interval.

In an embodiment, based on the monitored load and availability, the centralized security control system 150 continuously computes an aggregated load metric (ALM) of each protection resource. The ALM is a unified metric representing the global load on a respective protection resource. In one exemplary implementation, for an available resource, the ALM can be computed as a maximum value among all load parameters' values. For an unavailable number, the ALM may be set to a null value. A device with a lower ALM is considered as a less loaded device.

The centralized security control system 150 is configured to implement the initial selection of the one or more "most appropriate" protection resources in one or more of the defense tiers to mitigate an on-going attack or to detect a potential attack against a protected entity 180 or the infrastructure of the backbone network 110 or any of the edge network 130.

In an embodiment, for each security service, the centralized security control system 150 is further configured to assign one or more of protection resources from any defense tier to handle traffic entering from each edge network's 130 and/or network's 110 relevant peering points towards the protected entity. Prior to assigning the actual protection resources 160, 185, and 170, a health check is performed to determine if the resource is available and if the current load of the resource is below a predefined threshold indicating if the resource has sufficient capacity to handle additional mitigation resources. Connectivity from relevant peering points to the potential protection resources is also checked.

In an embodiment, the selection of the protection resources from any defense tier is performed based on a plurality of selection parameters. The selection parameters include, but are not limited to, security capabilities of the mitigation of the resource, a peer points proximity, a computed ALM, user (e.g., an administrator) preferences, a SLA guaranteed or assigned to a security service, dynamic proximity to peers, security risk distribution, attack persistency, an attack class/risk, an attack scale (or volume), and so on.

The peer point proximity determines the proximity of each protection resource 160, 170, or 185 to the relevant peers of an edge network. Typically, resources that are in close proximity to the customer network edges are selected with higher precedence. The dynamic proximity to peers is determined, for example, based on number of hops from peer to protection resources, available bandwidth, QoS, and the like. The security risk distribution indicates if the same threat has been detected in different networks or zones in the network 100. This can lead to a selection of a high capacity, or high capability, protection resource 160 in tier-1 over tier-2. The attack persistency determines if an attack is persistent in a certain tier, in terms of time or recurrence, which may lead to a decision of moving the mitigation to a higher tier to allocate higher capacity and/or security capabilities protection resources to seize the attack.

The attack class/risk mitigation is an attack classification score which may lead to a decision to select a high capacity and/or security capabilities protection resource 160 in tier-1 over a medium capacity or capability protection resource 170 in tier-2. The attack scale would contribute to the number of protection resources 160, 185, and 170 to be selected to mitigate the attack. It should be noted that a selection of a protection resource from any of the defense tiers may be on any combination of the above selection parameters.

In some embodiments, the selection parameters are assigned with weights. For each protection resource, a selection score is computed as a weighted sum of the determined values of the selection parameters. A protection resource with a selection score below a certain threshold is selected. In an exemplary embodiment, different threshold values are set for different defense tiers. This may allow for determining if protection resources from a single tier, some tiers, or all tiers should be selected.

As an example, for a protected entity deployed in the backbone network 110, the least loaded high capacity protection resource 160 is selected. When a protected entity is deployed at an edge network 130, a least loaded medium capacity resource 170 located in close proximity to the protected entity 180-1 would be selected.

As some of the selection parameters are dynamically updated, the protection resources 160, 185, and 170 can be dynamically selected to ensure contiguous efficient mitigation of threats. Therefore, the security control system 150 can decide to delegate existing protected entity from being handled by protection resources in a specific tier, for example tier 2, to protection resources in a higher tier, for example, a scrubbing center 112 deployed in tier-1. The process for dynamically selecting protection resources 160, 185, and 170 is discussed in detail below with reference to FIG. 4.

In an exemplary embodiment, the protection resources can be actually allocated as part of service provisioning or upon active attack detection. In such an embodiment, prior to monitoring the traffic to determine if an attack is properly handled, an initial selection of a proper selection (in terms of capacity and security capabilities) of the protection resource is performed.

Figure 2:
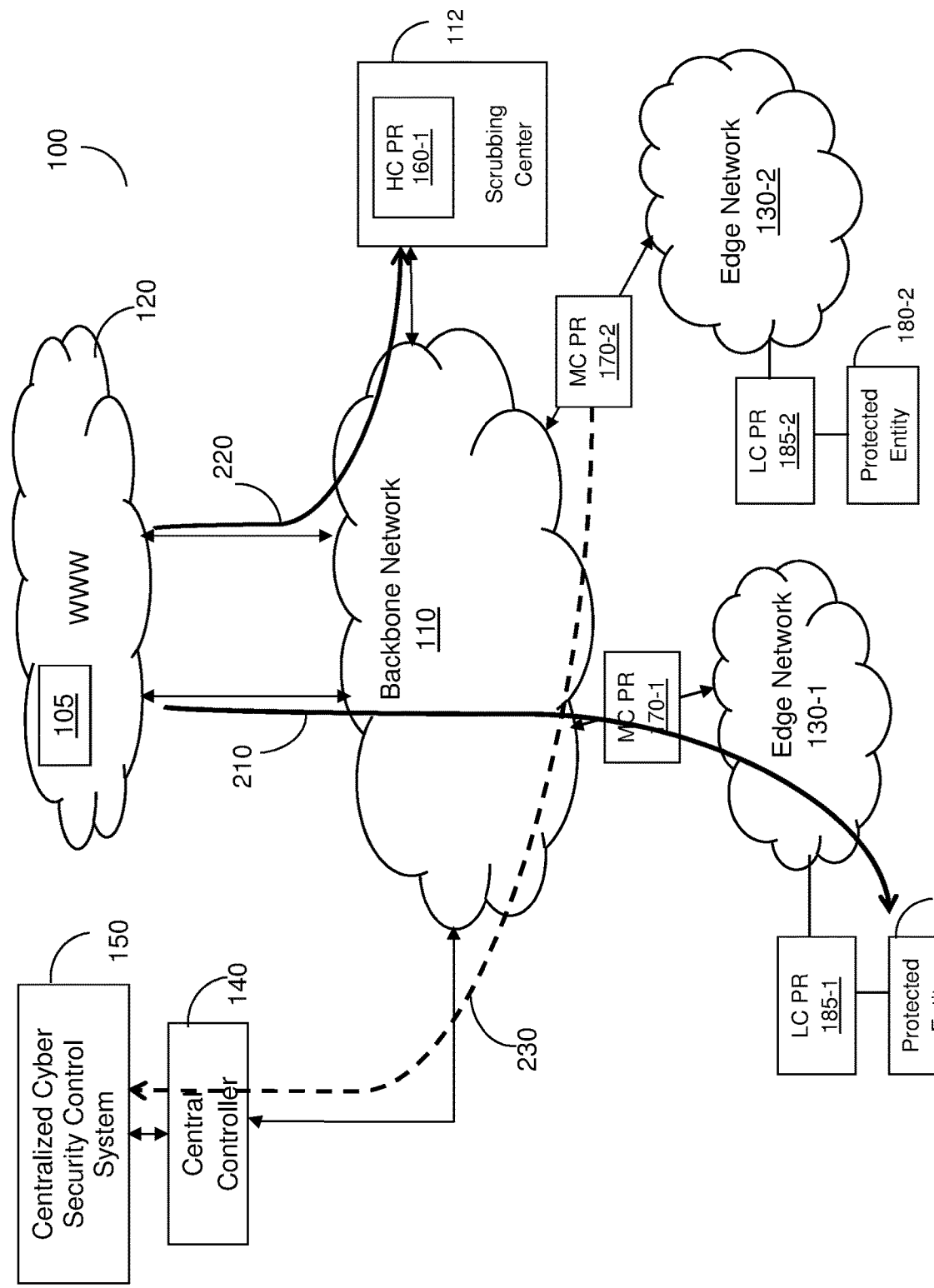
FIG. 2 illustrates a large scale network for demonstrating an example for the operation of the disclosed embodiments.

Referring now to FIG. 2 which illustrates the operation 200 of the disclosed embodiments, the various elements shown in FIG. 2 are discussed with reference to FIG. 1. In this example, the low capacity protection resource 185-1 is selected and configured to detect or mitigate DDoS attacks. The low capacity protection resource 185-1 acting as a mitigator is directly connected to a protected entity 180-1.

During an active DDoS attack 210 against the protected entity 180-1, the low capacity resource 185-1 is configured to continuously report to the centralized security control system 150 its overall mitigation status, attack details, and load information. The centralized security control system 150 is configured to analyze the received attack 210, along with the overall mitigation resource selection attributes (as described above) to determine if the low capacity protection resource 185-1 can handle the specific attack. The determination may be based on the attack type and scale, an ALM value computed for the low capacity protection resource 185-1, and/or security capabilities per resource. For example, if the low capacity protection resource 185-1 is too loaded (based on the computed ALM) and it is a high volume attack, then the low capacity protection resource 185-1 is not likely to handle the attack efficiently or not at all.

It should be noted that the determination if the low capacity protection resource 185-1 cannot handle the attack 210 may be further based on the load of the links connecting the protected entity 180-1 to the edge network 130-1 or links between the backbone network 110 and edge network 130-1. Overloaded links indicate that the device cannot efficiently mitigate the attack even if it has the required resources and the security capabilities to handle it.

If the centralized security control system 150 determines that the resource 185-1 cannot handle the attack 210, one or more other protection resources are selected. In an embodiment, an attempt to increase the capacity of the 185-1 may also be performed. As noted above, the selection may be of resources from any defense tier, but likely of resources from tier-0, tier-1 and/or tier-2. In this example, a high capacity protection resource 160-1 deployed in a scrubbing center 112 is selected to mitigate the attack 210. To this end, traffic 220 directed to the protected entity 180-1 is delivered to the high capacity protection resource 160. On example for a method for diverting traffic is described in U.S. patent application Ser. No. 13/913,916 to Chesla, et al., assigned to the common assignee and hereby incorporated by reference.

In a different implementation, the low capacity protection resource 185-1 can be configured as a detection probe device directly connected to a protected entity. When an attack 210 is detected by protection resource 170-2, it signals an attack indication 230 along with attack details to the centralized security control system 150. The security control system 150, in response, would select the most efficient high capacity protection resource (e.g., resource 160-1) to handle and mitigate the attack.

It should be noted that such a configuration allows for distributing the attacks among different defense tiers. This allows for protection of a very large number of protected entities 180 at the same time with a reasonable cost and good ROI and to provide an on-demand higher (from cost, scale, volume, and capabilities consideration) security service for entities (customers) under high volume or sophisticated attack. Further, information collected by the low and/or medium capacity and capability protection resources acting as probes can be utilized to analyze traffic at a lower tier, without consuming valuable network and/or security resources. Information that can be derived from such analysis includes, for example, specific application parameters stats, requests/responses data, access to SSL decrypted traffic, black and white lists, and more.

Figure 3:
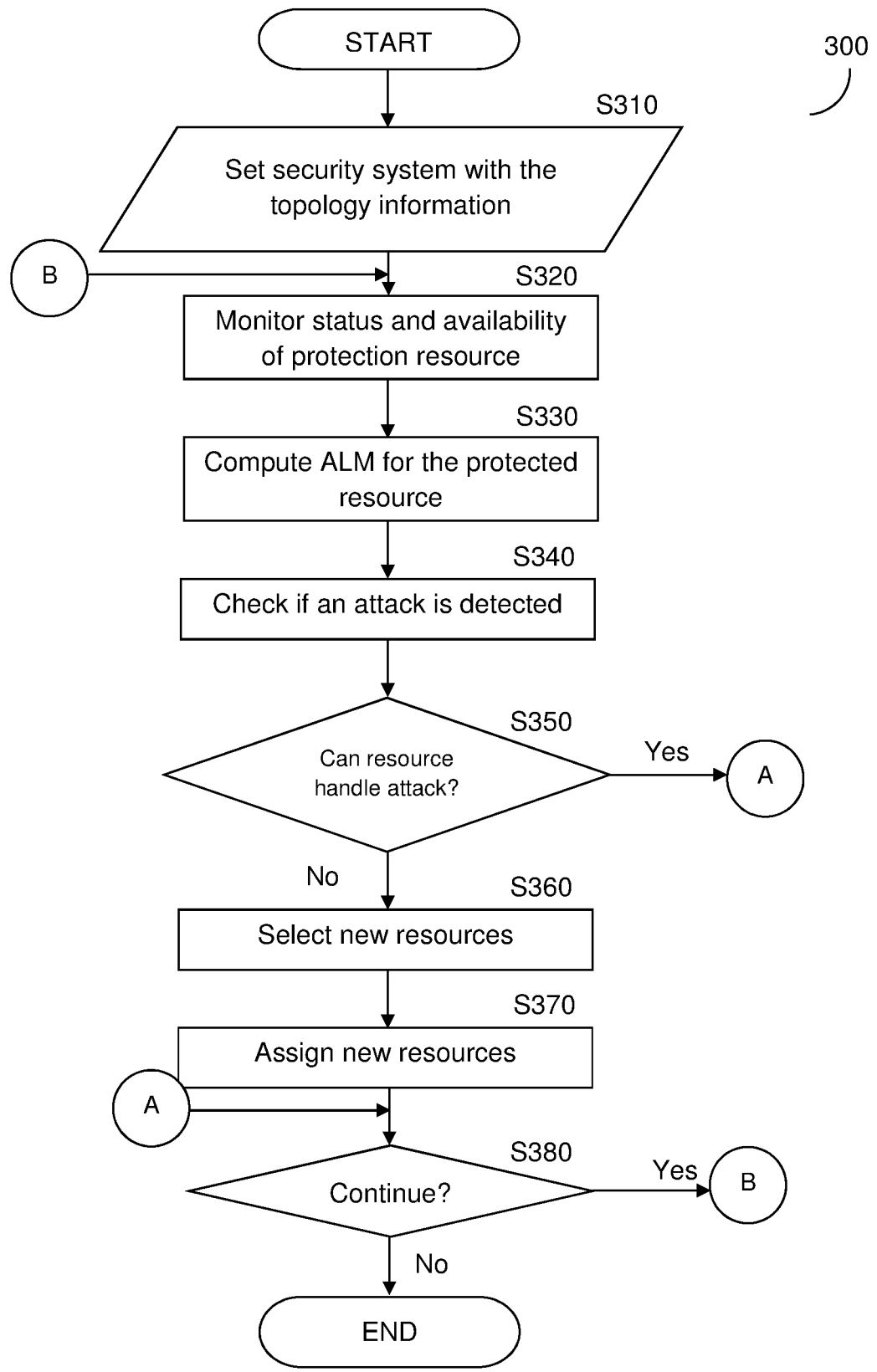
FIG. 3 is a flowchart describing a method for cross-tiers mitigation of cyber-attacks according to an embodiment.

FIG. 3 is an exemplary and non-limiting flowchart 300 illustrating a method for performing cross tiers mitigation of cyber-attacks according to one embodiment. The method can be performed by the centralized security control system 150. At S310, the security system 150 is set with the topology information about the large scale network (e.g., network 100). This information includes identifiers and/or addresses of at least the protected entities, the various defense tiers logically configured in the system, the various protection resources and their security capabilities, scrubbing centers, relevant network elements, and so on.

At S320, the status and availability of each protection resource is monitored. As noted above, this includes at least checking if a protection resource is currently available and the current load, based on the load parameters, on the protection resource. The various monitored load parameters are discussed in greater detail above. In an embodiment, the load of links connecting the protected entities is also monitored. This can be utilized to determine the load on the protection resource assigned to secure the protected entity. In an exemplary embodiment, a signal may be received from overloaded capacity protection resources deployed in tier-2 or tier 3. Such signal can indicate that the resources cannot handle additional threats.

At S330, based on the load monitored parameters, an ALM is computed for the protected resource. It should be noted that S320 and S330 are repeatedly performed every predefined time interval. The parameters are monitored as mentioned above.

At S340, it is checked if an attack against the protected entity has been detected. This attack can be a newly detected attack or an on-going attack. An attack indication can be received from an active protection resource (160, 170, or 185), an external system connected to the security system 150, an indication provided by a user, or any combination thereof.

At S350, another check is made if the current protection resource assigned to secure the entity under attack can efficiently handle the on-going attack. The check is performed in part based on any one of a combination of the ALM as well as the attack's type, risk, volume, and so on. For example, if the ALM is high (indicating high load), a high volume attack cannot be efficiently handled by the currently active protection resource. In an embodiment, the check is performed in comparison to a set of thresholds set respective of the ALM and the attack parameters (risk, volume, type).

If S350 results with a yes answer, then execution proceeds to S380; otherwise, at S360 one or more new protection resources are selected to secure the protected entity. The selection may be of a low, medium, or a high capacity protection resource. That is, a new protected resource can be selected regardless of the location of the protected entity. For example, a high capacity or security capabilities protection entity can be utilized to protect an entity deployed in an edge network 130. A method for selecting new protection resources is discussed with respect to FIG. 4. In an embodiment, instead of or in addition to selecting a new resource, the capacity of the current assigned protection may be increased by means of virtualization technologies, such as increasing of the number of CPUs, and the like.

At S370, the new selected protection resource(s) are assigned to the protected entity. In an embodiment, S370 may also include directing traffic to the new selected protected resource. At S380, it is checked if the method should be continued, and if so execution returns to S320; otherwise, execution ends.

Figure 4:
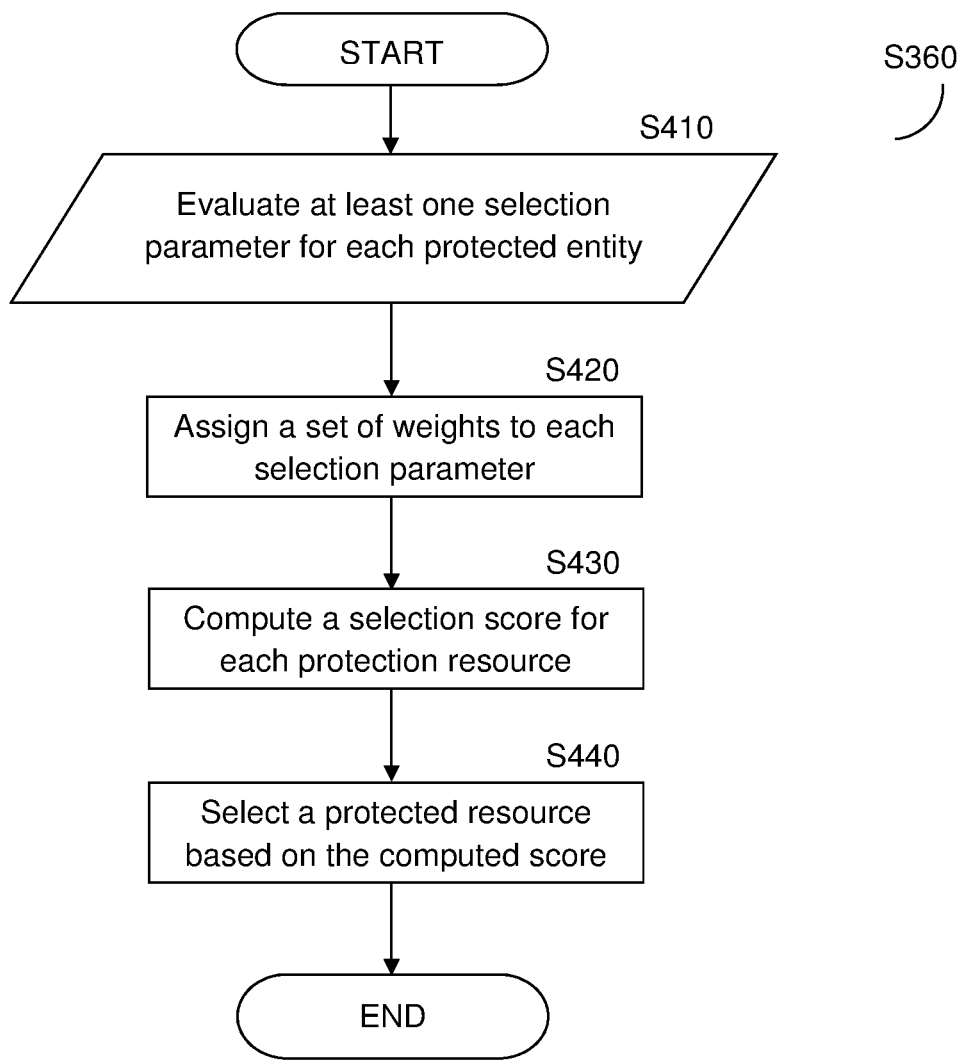
FIG. 4 is a flowchart describing a method for selecting protection resources according to one embodiment.

FIG. 4 shows an exemplary and non-limiting flowchart illustrating a method S360 for selecting at least one protection resource according to one embodiment. The method ensures a selection of a protection resource or resources that can optimally secure a protected entity. In addition, the selection ensures that the protection resource is fully utilized. That is, a high capacity or security capabilities protection resource will not be selected instead of a low capacity or security capabilities protection resource when the latter can handle the attack.

At S410, for each protected entity, at least one selection parameter is evaluated. As mentioned above, the selection parameters include, but are not limited to, a peer point proximity, a dynamically computed ALM, user (e.g., an administrator) preferences, a SLA guaranteed or assigned to a security service, dynamic proximity to peers, security risk distribution, attack persistency, an attack class/risk, an attack scale (or volume), and so on. The evaluation of the protected entity is with respect to the protected entity. For example, the peer point proximity is evaluated relatively to the active protection entity. In an exemplary implementation, a value of each valuated parameter may be between 0 and 1.

At S420, a set of weights is assigned to each selection parameter. The weight may be dynamically changed and/or be different from one protected entity to another. In an embodiment, the sum of weights is equal to 1. At S430, a selection score (Si) is computed and normalized for each protection resource for 'n' protection resources (i=0, . . . , n) based on the evaluated parameters' values and the assigned weights.

In an embodiment, the selection score Si is computed as follows:

$$Si = \sum_{k=1}^{m} Pki * Wk$$

where $P_{ki}$ is the evaluated selection parameter 'k' for a resource 'i', and $W_k$ is the respective weight assigned to the parameter. That is, Si is the linear combination, or sum-product of the selection parameters and their respective weights.

In another embodiment, the selection score Si is computed as follows:

$$Si = \max_{k}[Pki * Wk]$$

At S440, the protected resource is selected based on the respective computed score 'Si'. In an embodiment, when Si is computed using the above equations, the protected resource having lowest selection score is selected. In an embodiment, the protected resource is selected as:

$$i = \operatorname*{argmin}_{i}[Si]$$

Figure 5:
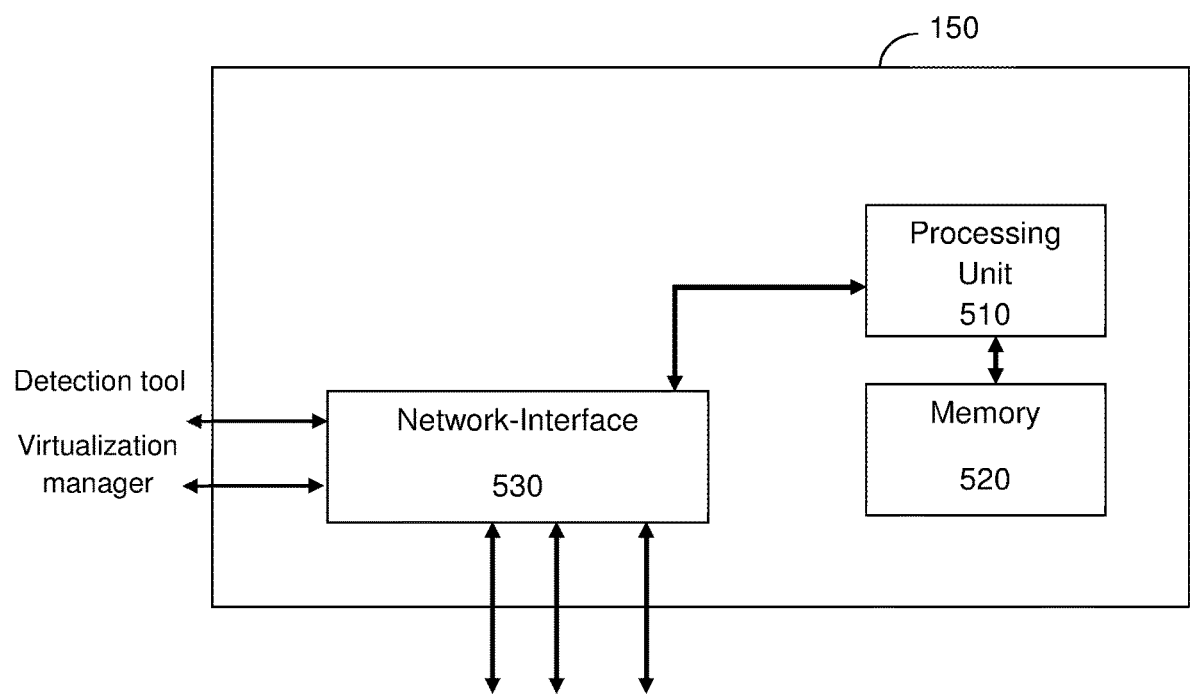
FIG. 5 is a block diagram of the centralized security system constructed according to one embodiment.

FIG. 5 shows an exemplary and non-limiting block diagram of the centralized security control system 150 constructed according to one embodiment. The centralized security control system 150 includes a processing unit 510 coupled to a memory 520, and a network interface 530.

The network interface 530 is configured to allow the communication with the protection resources and the protected entities in the various tiers of the network (e.g., 100). The network interface 530 is configured to allow the communication with an external management system and/or a central controller of a SDN (or any other type of networks control plans, such as BGP and BGP FlowSpec), and the like. In an embodiment, the network interface 530 allows the communication with the network elements of a SDN. In a non-limiting embodiment, such communication uses, for example, the OpenFlow protocol or communicates through a control channel.

The processing unit 510 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 510 may also include machine-readable media for storing software. Software should be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions.

The memory 520 may comprise volatile and/or non-volatile memory components, including, but not limited to, static random-access memory (SRAM), dynamic random-access memory (SRAM), Flash memory, magnetic memory, and other tangible media on which data and/or instructions may be stored. The memory 520 may contain instructions that, when executed by the processing unit 510, performs, for example and without limitations, the processes for performing cross tiers mitigation of cyber-attacks as described in more detail in above. The memory 520 may also include one or more of a list of protection resources, protected entities, and computed ALM values, values of evaluated selection parameters, assigned weights, and so on.

The various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A centrally controlled cyber security system implemented by computer for use in protecting a multi-tiered communication network, the centrally controlled cyber security system comprising:
 a first defense tier comprising logic for protecting a backbone network of the multi-tiered communication network against at least one cyber-attack designed to cause a denial of service;
 a second defense tier comprising logic for protecting a plurality of edge networks of the multi-tiered communication network against at least one cyber-attack designed to cause a denial of service;
 a third defense tier comprising logic for protecting a plurality of entities coupled to the multi-tiered communication network against at least one cyber-attack designed to cause a denial of service; and
 a centralized cyber security controller including at least one hardware logic circuit;
 wherein the first defense tier, the second defense tier, and the third defense tier are in communication with, and controlled by, the centralized cyber security controller.

2. The centrally controlled cyber security system of claim 1, wherein the first defense tier comprises high capacity protection resources.

3. The centrally controlled cyber security system of claim 2, wherein any of the high capacity protection resources includes high capacity detection and mitigation resources.

4. The centrally controlled cyber security system of claim 2, wherein any of the high capacity protection resources is configured to operate in any of the following deployments: an inline deployment, an out of path (OOP) deployment, a local out of path (LOOP) deployment, or an in-device deployment.

5. The centrally controlled cyber security system of claim 4, wherein the second defense tier comprises with medium capacity protection resources.

6. The centrally controlled cyber security system of claim 5, wherein any medium capacity protection resource is configured to operate in any of the following deployments between the backbone network and one of the respective edge network: an inline deployment, an OOP deployment.

7. The centrally controlled cyber security system of claim 6, wherein each of the medium capacity protection resources are configured to handle less traffic volume than the high capacity protection resources.

8. The centrally controlled cyber security system of claim 1, wherein the third defense tier comprises low capacity protection resources.

9. The centrally controlled cyber security system of claim 8, wherein each of the low capacity protection resources is allocated per entity.

10. The centrally controlled cyber security system of claim 9, wherein the low capacity protection resource can is configured to operate in any of the following deployments: a virtual application layer deployment, an in Inline deployment, a local out of path (LOOP) deployment, an in-device deployment, and a virtual appliance.

11. The centrally controlled cyber security system of claim 10, wherein each of the low capacity protection resources are configured to handle less traffic volume than the medium capacity protection resources.

12. The centrally controlled cyber security system of claim 11, wherein a low capacity protection resource is provisioned as a probe device for attack detection.

13. The centrally controlled cyber security system of claim 1, wherein the network further comprises:
a cloud-tier comprising logic designed to handle at least one cyber-attack designed to cause a denial of service at the Internet.

14. The centrally controlled cyber security system of claim 1, wherein:
the centralized cyber security controller is configured to orchestrate protection resources deployed in the first tier, the second tier, and the third tier.

15. The centralized cyber security control system of claim 1, wherein the centralized cyber security controller is further configured to: select a new protection resource to secure an entity in one of the first tier, the second tier, and the third tier, when a protection resource currently assigned to a protected entity cannot efficiently handle a detected cyber-attack.

16. The centrally controlled cyber security system of claim 15, wherein the selection is based on at least one of: a computed current aggregated load metric (ALM) and a security capability of the at least one protection resource, and wherein the at least one new protection resource is in a higher tier than the tier of the multi-tiered communication network than a protected entity.

17. The centrally controlled cyber security system of claim 1, wherein the cyber-attack is any one of: a denial of service (DoS) attack and a distributed DoS (DDoS) attack.

18. The centrally controlled cyber security system of claim 1, wherein at least one of the first defense tier, second defense tier, and third defense tier are implemented by at least one hardware logic circuit of the computer.

19. The centrally controlled cyber security system of claim 1, wherein the at least one hardware logic circuit of the centralized cyber security controller is part of the computer.

20. The centrally controlled cyber security system of claim 1, wherein at least a portion of at least one of the multi-tiered communication network is a software defined network.

* * * * *